E. L. P. COLARDEAU.
TRAIN OF VEHICLES.
APPLICATION FILED NOV. 13, 1919.
1,416,613.
Patented May 16, 1922.
3 SHEETS—SHEET 1.
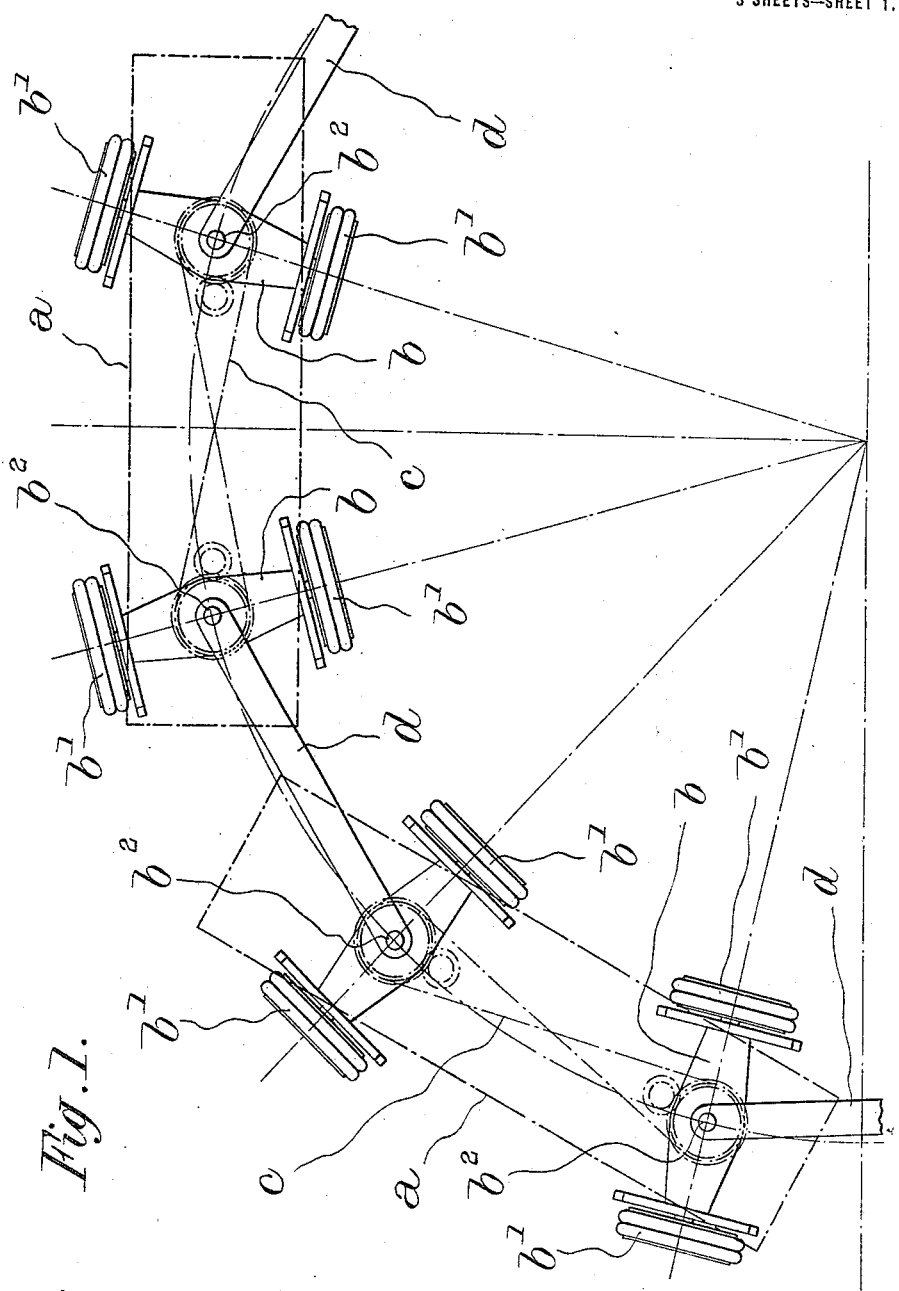

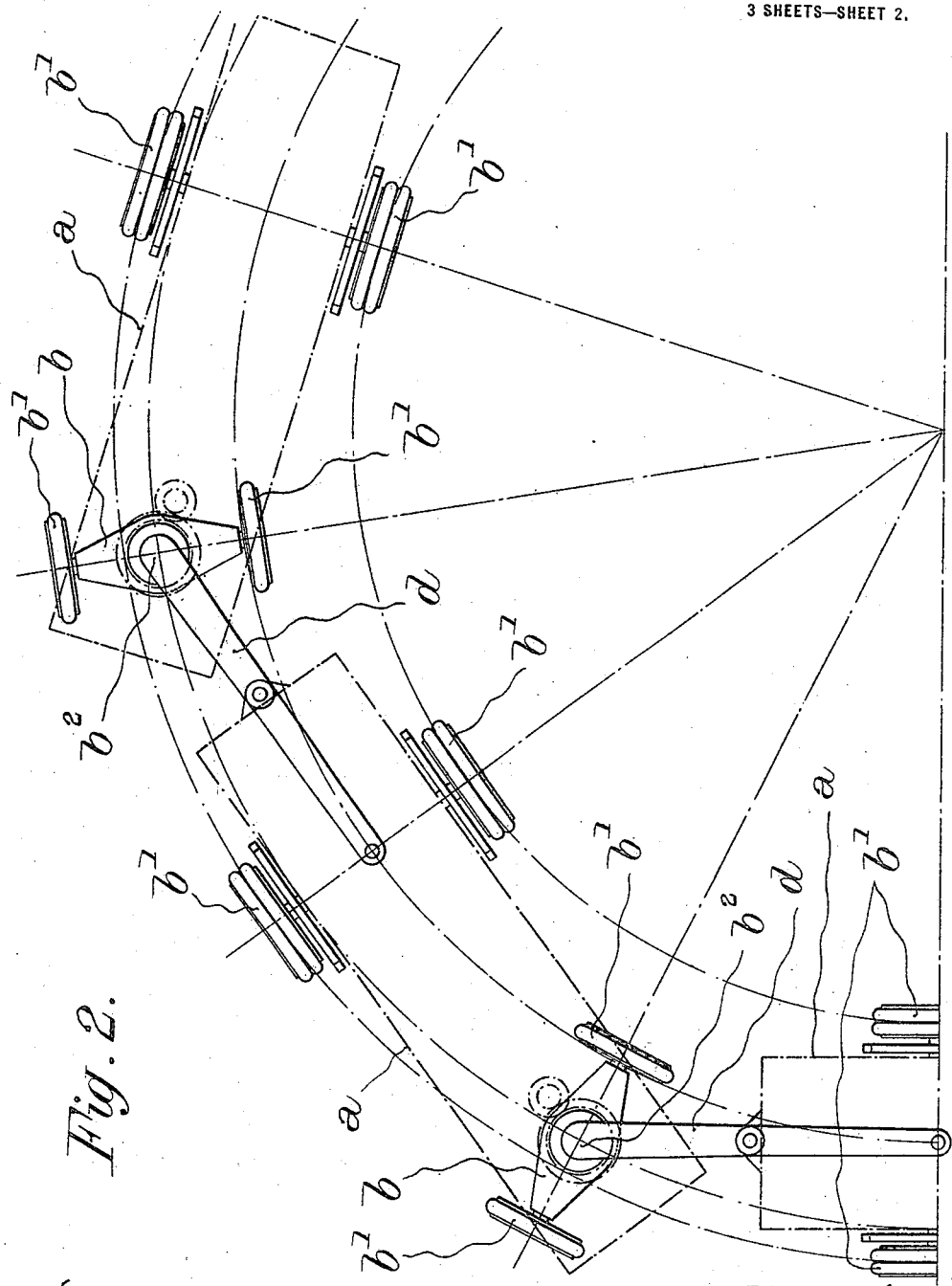

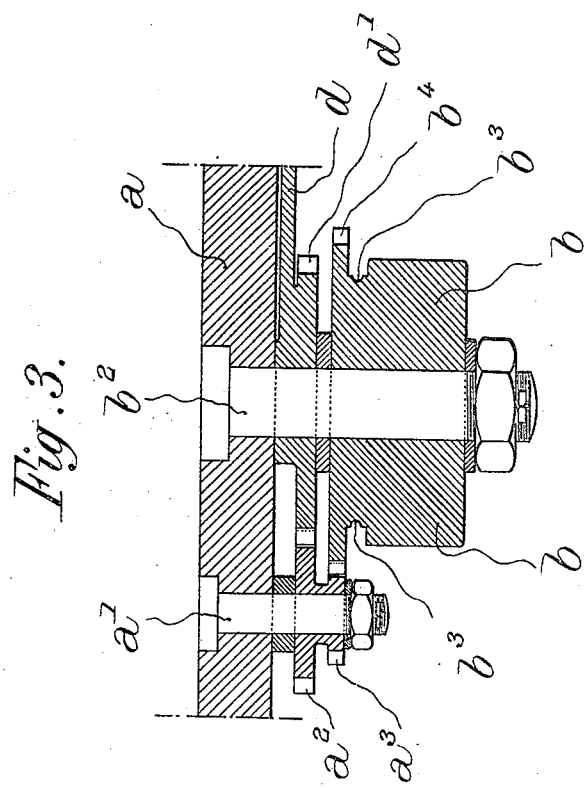

UNITED STATES PATENT OFFICE.

EMMANUEL LOUIS PAUL COLARDEAU, OF PARIS, FRANCE, ASSIGNOR TO THE SOCIETY ETABLISSEMENTS HENRY CROCHAT, OF PARIS, FRANCE.

TRAIN OF VEHICLES.

1,416,613.                      Specification of Letters Patent.       Patented May 16, 1922.

Application filed November 13, 1919. Serial No. 337,748.

*To all whom it may concern:*

Be it known that I, EMMANUEL LOUIS PAUL COLARDEAU, engineer, citizen of the French Republic, residing at Paris, France, have invented certain new and useful Improvements in Trains of Vehicles, of which the following is a specification.

The invention relates to trains of vehicles, particularly road trains.

The invention has for its main object to arrange the vehicles of the trains so that their turning can be affected in a better manner than hitherto.

The invention mainly consists in arranging the train of vehicles so that the distance between the wheels of one vehicle and the distance between the rear wheels of the towing vehicle and the front wheels of the trailing vehicle, are equal to each other; in pivoting the coupling or draw bar on a vertical pin passing through the axis of the front wheels of the trailer, and connecting the said bar to the said front wheels by such a transmission gear that to any angular movement of the said bar corresponds half as great an angular movement of the said wheels.

The invention comprises other arrangements hereinafter more explicitly referred to.

In the accompanying drawings, by way of example.

Figures 1 and 2 show respectively, in plan and diagrammatically, vehicles constituting a road train according to two ways of carrying out the invention.

Figure 3 shows in section through the axial longitudinal plane of one of the said vehicles, a detail of the said vehicle.

In constituting a train in which each vehicle comprises two pairs of steering wheels, each vehicle has a chassis $a$ which is supported by two bogies or trucks $b$ with two wheels $b^1$ mounted on two pivots $b^2$ perpendicular to the axis of the said chassis, and any means is used which is adapted to enable the axes of the two trucks, assumed to have been extended, to intersect each other at one and the same point which will be the centre of turning. For this reason to each of the trucks is secured a pulley $b^3$ concentric with the pivot $b^2$, and over these two pulleys is passed an endless crossed cable $c$ or belt.

Two of these vehicles are so connected together by means of a coupling bar $d$ which is pivoted, as hereinafter described, at its two ends respectively, to the rear pivot pin of the rear truck of the towing vehicle and to the front pivot pin of the trailing vehicle that, to any angular movement of the said bar corresponds half as great an angular movement of the wheels $b^1$. A gear $b^4$ is situated on the pivot $b^2$, as shown in Figure 3, and a toothed wheel $d^1$ is mounted loosely on the said pivot pin and the toothed wheel $d'$ of each forward truck of the vehicles is secured to one end of the coupling bar $d$. The forward end of the bar $d$ is pivotally mounted on the pin $b^2$ of the rear truck of the towing vehicle and is movable independently of the toothed wheel $d'$. Also, on one end of a pin $a^1$ parallel to the pivot pin $b^2$, are mounted loosely two pinions $a^2$ and $a^3$ secured to each other, whereby the wheel $d'$ and gear $b^4$ mesh respectively with the pinions $a^2$ and $a^3$, and the said pinions, gear and wheel are made of such relative diameters that to an angular movement of the bar $d$ and consequently of the wheel $d^1$ which is secured to the said bar corresponds half as great an angular movement of the gear $b^4$, and therefore of the truck $b$ which is secured to the said wheel $b^4$.

Finally the distance between two consecutive pivot pins of the coupled vehicles is made the same.

Calculation shows that, in these conditions, whatever be the number of vehicles coupled together, the straight lines passing through the centres of the various pairs of wheels, will all meet in one and the same point, which is the centre of two circumferences described respectively during turning by the inner and the outer wheels of the train.

When it is desired to constitute a train in which each vehicle comprises a pair of steering wheels in front, and a pair of non-steering wheels, the steering wheels of the vehicles to be trailed, are mounted on trucks $b$ identical in construction to the trucks $b$ above described and connected to one of the ends of the coupling bars shown in Figure 2.

For this latter arrangement also, and whatever be the magnitude of the angular movement, and if the distance between the centres of trucks of each vehicle is still equal to the distance between the centres of the rear and front trucks of the tractor and trailer vehicles, the principle set forth applies in every way, and it is easy to prove that the straight lines passing through the centres of the different pairs of wheels all meet in one and the same point, the centre of two circumferences described by the steering wheels, and the centre of two circumferences described by the non-steering wheels of the train, and that moreover the centre of the front truck of the trailer vehicle will be always situated in the longitudinal plane containing the axis of the tractor vehicle, and therefore that the other end of the coupling bar can be fixed at any point to the said axis. It is preferable however to connect the bar to the said point by a hinge joint so as to give more suppleness to the coupling, and in such a case, for the sake of greater facility, it will be sufficient to hook it to the rear end of the tractor vehicle.

Obviously, instead of having steering wheels on trucks, steerings wheels might be used adapted to be turned similarly to those of ordinary motor cars.

Obviously the invention is not limited to the apparatus described, but comprises any modifications within the scope of the claim.

Having now particularly described and ascertained the nature of my said invention and in what manner the same is to be performed, I declare that what I claim is:—

In a train of vehicles in which the distance between the wheels of one vehicle, and the distance between the front wheels of a trailing vehicle and the rear wheels of the towing vehicle are normally equal to each other, the combination of a coupling bar, pins inserted through respective ends of said bar and the corresponding truck of the vehicles for pivotally connecting said bar to the rear truck of the towing vehicle and the front truck of the trailing vehicle, a gear on each of said pivot pins secured to each of said trucks, a toothed wheel mounted loosely on each of said pivot pins, the rear end of the coupling bar being secured to one of said toothed wheels, a pin mounted in the frame of the vehicle parallel to said pivot pin, two pinions secured together and loosely mounted on said second pin, the said pinions engaging with the toothed wheel and gear respectively, said toothed wheel, gear and pinions having such relative diameters that to each angular movement of the coupling bar corresponds half as great an angular movement of the trucks.

In testimony whereof I have hereunto set my hand in presence of two subscribing witnesses.

EMMANUEL LOUIS PAUL COLARDEAU.

Witnesses:
 CHAS. P. PRESSLY,
 E. TULLIER.